INVENTOR
VICTOR R. SIMPSON
BY Maurice H. Klitzman
ATTORNEY

Aug. 8, 1961 V. R. SIMPSON 2,995,360

DOCUMENT FEEDING

Filed Dec. 30, 1959 6 Sheets-Sheet 2

Aug. 8, 1961 V. R. SIMPSON 2,995,360

DOCUMENT FEEDING

Filed Dec. 30, 1959 6 Sheets-Sheet 3

Aug. 8, 1961 V. R. SIMPSON 2,995,360

DOCUMENT FEEDING

Filed Dec. 30, 1959 6 Sheets-Sheet 4

United States Patent Office 2,995,360
Patented Aug. 8, 1961

2,995,360

DOCUMENT FEEDING

Victor R. Simpson, Owego, N.Y., assignor to International Business Machines Corporation, New York, N.Y., a corporation of New York Filed Dec. 30, 1959, Ser. No. 862,814
5 Claims. (Cl. 271—27)

This invention relates to a means for feeding documents for use in business machines and in particular to a means for feeding large size documents, such as sheets, wherein the feeding means utilizes a vacuum type system for feeding the document into the transport section of the business machine.

It has been the practice to feed documents of large size from a hopper by vacuum type feeding means. Generally, these vacuum systems included vacuumized picker arms for singly picking documents from the hopper, thereafter transferring each document from one vacuumized picker arm to another vacuumized picker arm, and then feeding the documents into feed rolls or feed belts for feeding the documents through the transport section of the business machine. While passing through the transport section, various types of operations are performed on the documents such as reading, printing, sorting, or stacking.

These documents may contain various types of manifestations which represent various forms of information. The manifestations may be in the form of perforations or printing on the document which are very accurately positioned on the document. Therefore, in order to avoid errors in reading or printing the manifestations, it is important that there be a high degree of registration for the document at the time that the document reaches the sensing or printing stations. With a very large sheet, this alignment or registration becomes difficult to maintain since it must be carried through from the first to the last column of the sheet. Misalignment can take place while the sheets are in the hopper, picking up of the sheet from a hopper, or while transferring the sheet from the picker arm to a transport arm for transporting the sheet into the feed rolls. Registration is necessary for maintaining the appropriate timing of the various operations with respect to the document and to know where the document is located at any particular time in the machine cycle so that operations can be performed on a particular line or row of manifestations on the document. Therefore, the manifestations must appear at its proper location with respect to the sensing or printing means in order to avoid such errors. For example, if reading means such as brushes are used, and they are impulsed to see if a perforation or the like exists at the tenth index point in the cycle, the tenth row on the sheet must correspond to the tenth index position of the machine cycle so that any reading of a manifestation records the proper information. If the document is out of registration, then the read brushes will not read the correct manifestations representing the proper information on the forms. The manifestations must be in a definite relationship with respect to the reading means or printing means.

Therefore, various means have been used to align or register a document. In the vacuum type system for picking and feeding documents, it has been the practice to align the leading edge of the document to a front wall of a hopper, which wall has been accurately aligned with other portions of the machine. In this manner, the leading edge of the document is aligned while it is still in the hopper. Therefore, the operator knows where the leading edge is located when feeding of the documents begins. Supposedly, when the operator then picks the first document, it will be in timed relation with the various machine cycle operations to be performed in the machine.

However, it has been found that unacceptable errors have been encountered necessitating greater accuracy in order to handle the larger types of sheets. Furthermore, with the higher speed accounting equipment, greater accuracy is required since minor problems become more accentuated with increase in speed. It has been found that small alignment errors, although negligible in previous equipment, are not acceptable in the high speed machines or where larger forms are used.

A major cause of aligning errors in vacuum systems has been in picking a document from a hopper, and in transferring the document to another picker means for feeding it into the transport section of the machine. The initial picking of the document from the hopper not only is unsatisfactory, but the method of transferring the sheet to another picker arm has also been unsatisfactory. This has been due to the fact that the pickers temporarily lose control of the document during the transfer process insofar as the registration is concerned. In the initial picking of the document, it is customary to utilize several vacuumized pickers to lift the sheet and separate it from any remaining sheets in the hopper. These pickers cannot lift a large document from the other documents by suction means and have all portions of the document simultaneously raised at all points at the various vacuum ports. It has been found that the vacuum cannot be controlled to that extent. Either one or the other end of the document, and sometimes the middle portion of the document, will raise up first. The first portion of the document that is engaged by one of the vacuum ports, controls where the leading edge of the document will eventually be positioned. If one of the corners comes up first, the other side of the paper is loose and is free to raise in any position whatever since the first side controls the position that the other side must follow. Now, when one corner comes up first, then a ripple occurs in the rest of the paper when the other side comes up. Then the paper attempts to straighten out but the vacuum opposes this tendency. As a result, the document is no longer aligned to the same location as it had when it was back in the hopper before it was picked up.

In transferring the document from the lifting vacuumized pickers to the transport vacuumized pickers, the same type of problems exist since any ripples or warpage originally in the document will be carried over from the lifting vacuumized pickers to the transporting pickers.

A contributing factor to misalignment is the result of the deck of documents itself. The larger and heavier the deck, the more ripple and more warp occurs. The warped surface of the document will not permit a uniform suction and therefore results in unequal attraction forces at the vacuum ports of the pickers. Furthermore, a certain amount of static electricity exists between the sheets. Various attempts have been used to break this attraction between the sheets. Since the static electricity is not equally distributed, some portion of the sheet will raise quicker than the others.

It is therefore apparent from the shortcomings of the prior art systems that they temporarily lose control of the document while picking the sheet or document from the stack even though the document has been previously aligned.

It is therefore a general object of this invention to obviate the above difficulties by providing a vacuum picking system that is capable of picking a large sheet at high speed yet maintaining the necessary registration of the sheet when it is fed into the transporting system of a business machine.

It is another object of this invention to realign a document after it has been aligned in a hopper and picked, but just prior to the document entering the transport section of the business machine.

It is yet another object of this invention to provide a vacuum system that is compatible with vacuumized picker arms by being able to provide vacuum to one of the arms, then to both of the arms, and then only to the other of the arms.

Briefly stated and in accordance with one aspect of this invention, a vacuumized picker system is provided in which a plurality of lifting picker arms lift the document from a hopper, transfer the documents from the lifting picker arms to a plurality of transport picker arms, there being a retractable aligner to permit alignment of the leading edge of the document on the transport picker arms, whereby the aligner is automatically actuated out of the path of the leading edge of the document so that the plurality of transport picker arms can transport the document into the transport section of the business machine.

The foregoing and other objects, features and advantages of the invention will be apparent from the following more particular description of a preferred embodiment of the invention as illustrated in the accompanying drawings.

Figure 6:
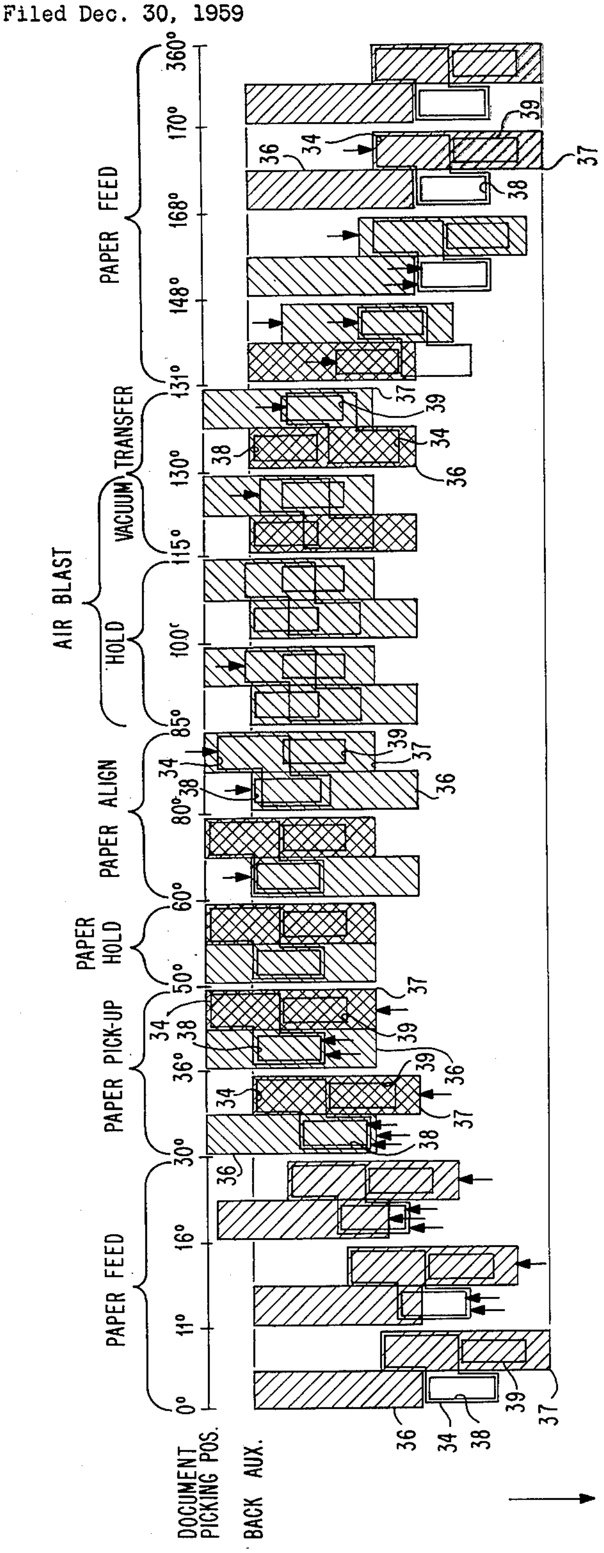
FIG. 6 is a view showing the various positions of the lifting picker arm and transport picking arm during a complete cycle in addition to the vacuum porting arrangements at those positions.
Figure 7A:
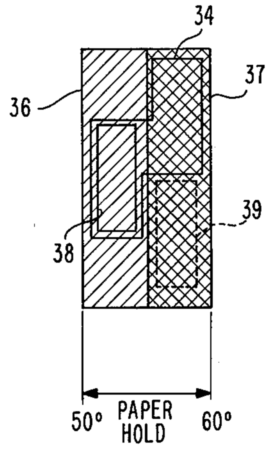
Figure 7:
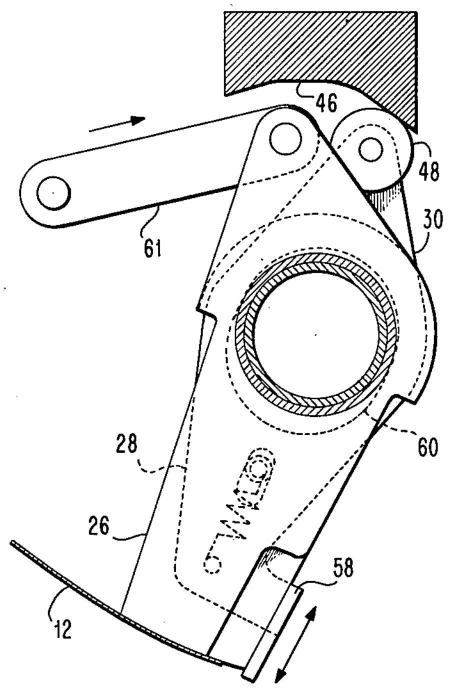

FIGS. 7 and 7*a* are views showing the positions of the lifting picker arm and transport picking arm and vacuum porting at the 60° position in FIG. 6 during the holding process.

Figure 8A:
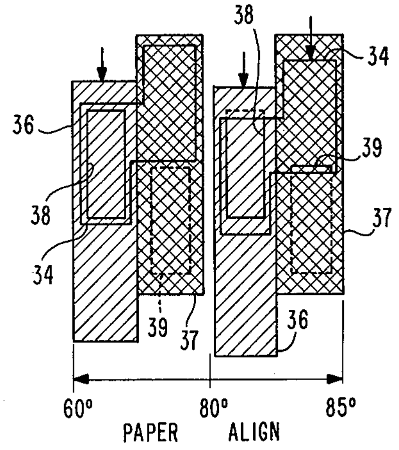
Figure 8:
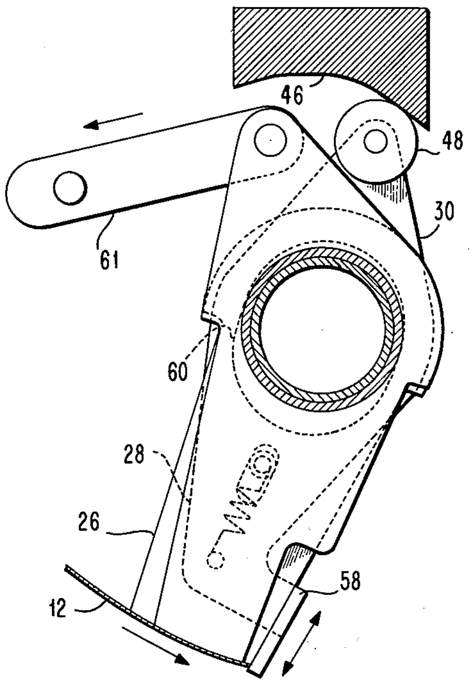

FIGS. 8 and 8*a* are views showing the positions of the lifting picker arm and transport picking arm and vacuum porting at the 80° position in FIG. 6 during the aligning process.

Although it is preferred that the arrangement be used with larger documents, it could also be adapted for smaller documents. Also, it is preferred that several document picking devices be used, only one of which will be described, the others being identical.

Figure 1:
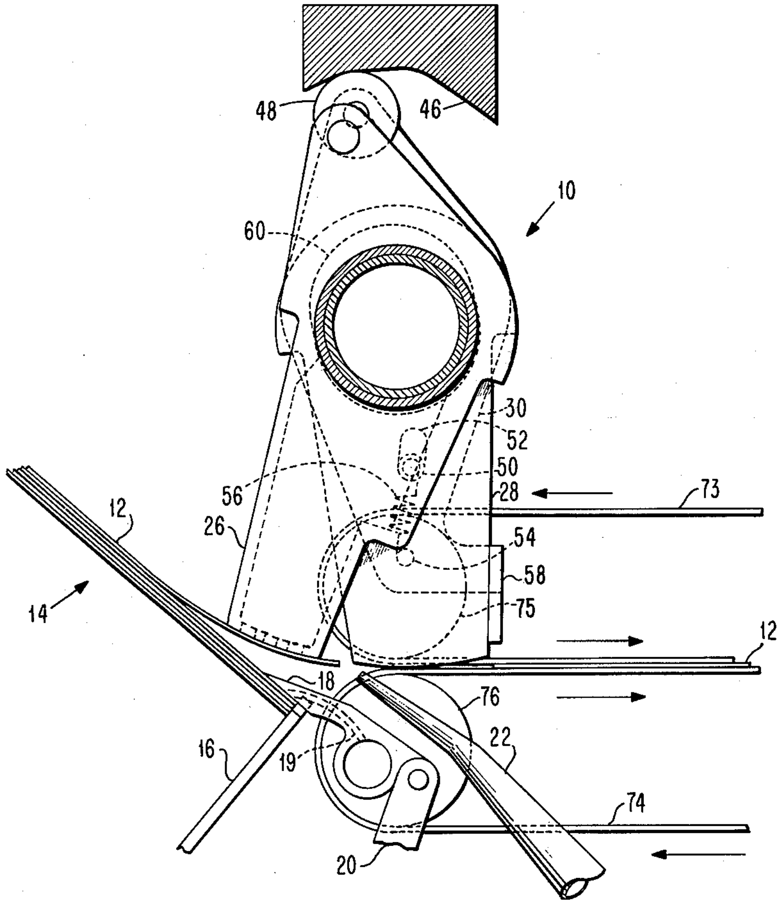
FIG. 1 is a view showing a document being picked from the hopper by the lifting picker arms.

Referring specifically to FIG. 1, the numeral 10 generally designates a document picking device for picking documents 12 from a hopper generally designated as 14. The front wall 16 of the hopper 14 provides an aligning means for aligning the leading edge of the documents 12. In addition to the front wall 16 for aligning the leading edge of the documents 12, an aligning finger 18 is provided with vacuum at 19. The aligning finger moves down on the documents 12 and then moves the leading edge of the documents forward so that they can be properly aligned against the front wall 16 before they are picked. Since the aligning finger 18 would normally be in the way and prevent documents from being picked, a link 20 is pivoted to the aligning finger 18 so as to pivot the finger out of the way of the documents during that time in the machine cycle when a document is to be picked from the hopper.

Quite frequently, static electricity between the sheets creates sufficient adhesion so that when the top sheet is picked, it carries along with it the second and sometimes a third sheet. In order to overcome this problem, it has been a common practice to utilize an air blast finger 22 which provides a blast of air along the leading edge of the documents. This air then passes downwardly between the sheets tending to separate them. In order to properly handle the documents, it is contemplated that a plurality of aligning fingers and air blast fingers will be disposed along the leading edge of the documents. However, for purposes of this description, only one of each of these has been described.

Now, in order to pick sheets from the hopper and convey them to a transport section, an outer rotatable support tube 24 is rotatably mounted in a side frame 25 (FIG. 3) on which document picking devices 10 are mounted. It is preferred that several document picking devices mounted on the support tube be disposed along the leading edge of the documents. However, only one of these will be described, the others being similar in construction. Each document picking device 10 includes a lifting picking arm 26 which is oscillatable with respect to the outer support 24 and lifts the documents from the hopper. The document picking device also includes a transport picker arm 28 which is fixed to the outer support tube by a pin or the like 29 to oscillate with it and for transporting the documents into the transport section of the business machine. A retractable sheet aligning arm 30 is retractably and rotatably supported on the tube and forms part of the document picking device against which the leading edge of the sheets are aligned just prior to moving into the transport section.

Figure 5:
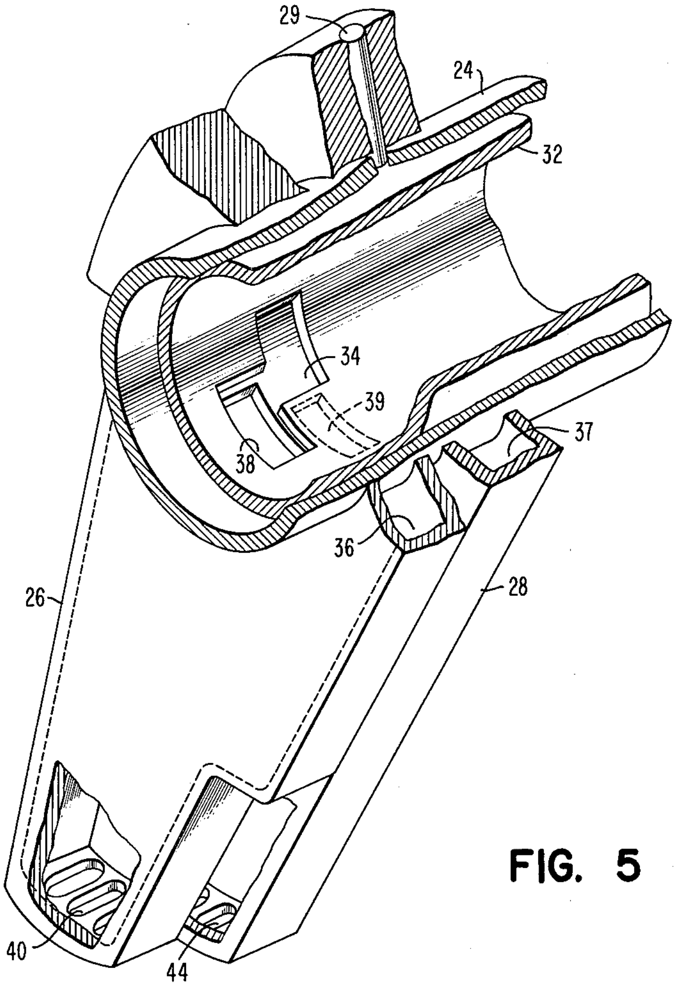
FIG. 5 is a view partially in broken section showing the position of the vacuum ports in the outer tube and inner tube with respect to the lifting picking arm and transport picking arm.

In order that the lifting picker arm can pick documents from the hopper 16 (FIG. 1) and transfer them to the transport picker arm 28, which in turn can transport the document into the transport section of the machine, vacuum is provided to an inner vacuum tube 32 (FIG. 3) positioned within the rotatable support tube 24. The inner vacuum tube contains a Z-shaped slot 34 (FIG. 5) for alignment at certain times with a vacuum passageway 36 in the picker arm 26 and for alignment at certain times with a vacuum passageway 37 in the transport picker arm 28. The outer rotatable support tube 24 also contains a slot 38 for alignment at certain times with the Z-shaped slot 34 and with the passageway 36 in the picker arm 26; and a slot 39 for alignment with the passageway 37 in the transport picker arm 28. Therefore, when the rotatable support tube 24 and tube 32 are rotated at preselected times, the slots are positioned so that the slot 34 and slot 38 align with the passagtway 36 in the lifting picker arm 26, then if rotated again, slot 34 and both slots 38 and 39 align with the passageway 36 in the picker arm 26 and passageway 37 in the transport picker arm 28, and then if rotated again, slot 34 and slot 39 align with the passageway 37 in the transport picker arm 28.

Figure 4:
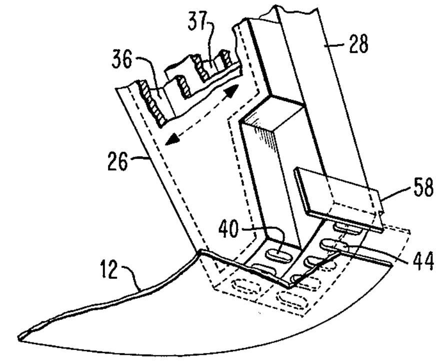
FIG. 4 is a perspective view partially in broken section showing vacuum ports on the lifting picker arm and transporting picker arm with respect to a document.
Figure 2:
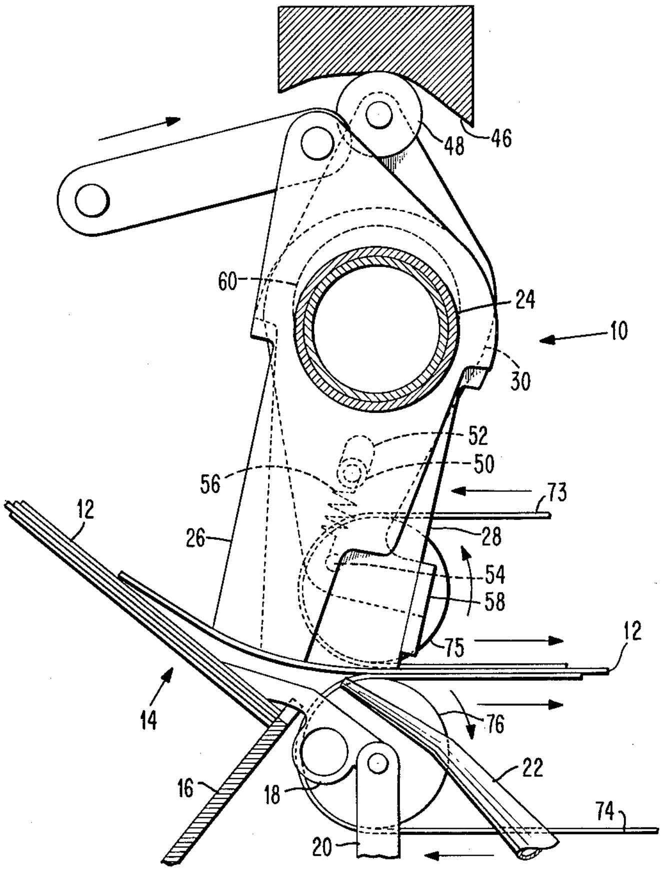
FIG. 2 is a view showing a document being fed into the transport section of the business machine.

The inner vacuum tube 32 is independently rotatable with respect to the outer tube 24 and with respect to the lifting picker arm 26 so as to provide the valving action for alignment of slots 34, 38, and 39 with passageways 36 and 37 in both picking arms at certain of the times. The passageway 36 terminates into a plurality of vacuum slots 40 (also FIG. 4) positioned in the toe of the lifting picker arm 26. Now, the transport picker arm 28 being fixed to the outer tube 24, the passageway 37 is exposed to slot 39 in the outer support tube 24 at all times and terminates into vacuum slots 44 in the toe of the transport picker arm.

A camming surface 46 (FIGS. 1 and 3) is provided so that the retractable aligning arm 30 can be raised or lowered as the case may be in a certain timing relation with respect to lifting and transporting of the document. In order to raise and lower the retractable aligning arm 30, a follower 48 rides on the camming surface 46.

A pin 50, as shown in dotted lines (FIG. 1), is mounted on the transport picker arm 28 and is slidable in a slot 52, which slot is in the retractable aligning arm 30. Another pin 54 is shown connected to the retractable aligning arm so that a spring 56 can be mounted between the pins 50 and 54. The spring normally biases the retractable aligning arm upwardly so that the follower 48 always engages the camming surface 46.

In order to align the leading edge of the documents just prior to their entering the transport section, the retractable aligning arm is provided with an aligning abutment or surface 58. Since the retractable aligning arm is to be raised and lowered, and since it is supported on the rotatable support tube, the retractable aligning arm contains an elongated aperture 60 to permit the aligning arm not only to rotate but also to be retractable. The elongated aperture 60 and drive pin 50 permits the retractable aligning arm 30 to move simultaneously with the transport picker arm 28, yet is cammed so that it can also retract with respect to the transport picker arm. This retractable action permits the document, which has been transported from the lifting picker arm 26 to the transport picker arm 28, to be transported into a transport section without obstruction, yet permitting the leading edge of the document to be registered just prior to it being inserted into the transport section. It is noted that the pin 50 attached to the transport picker arm 28 drives the aligning arm 30. The slot 52 and elongated aperture 60 permit the aligning arm to retract with forward movement of the transport picker arm 28.

Figure 3:
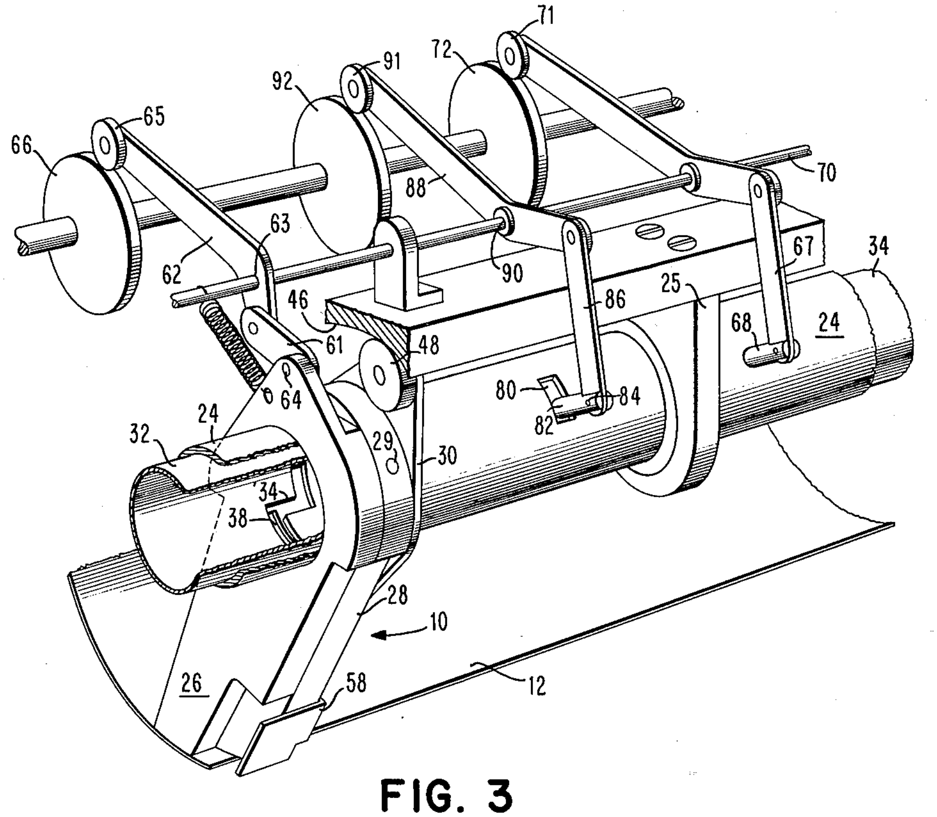
FIG. 3 is a perspective view showing the relationship of the lifting picker arm and transporting picker arm during transporting of a document.

Referring to FIG. 3, the lifting picker arm 26 is arranged on the rotatable support tube 24 so that it can be rotatable independently of it. This enables the lifting picker arm 26 to pick a document through vacuum slots 40 and then rotate, to transport the document to the transport picker arm 28 by a link 61 and bellcrank 62 pivotally connected to the lifting picker arm 26 at pivot 64. The bellcrank is connected to a fixed pivot 63 and a follower 65. The follower 65 rides on cam 66 to thereby rotate the lifting picker arm 26 at the proper time to align its passageway with vacuum ports 34, 38 to pick a sheet at the proper time and carry it forward to align and transfer the sheet to the transport picker arm 28, and then disalign the passageway 36 with vacuum ports 34, 38 to remove the suction it exerts on the document.

The transport picker arm 28 is fixed to the outer rotatable support tube 24 so as to be rotatable therewith. A lever 67 is pivoted to a stud or the like 68 fixed to the tube 24. A bellcrank 69 is pivoted on shaft 70, and a follower 71 pivoted to the bellcrank 69 rides on cam 72 so as to rotate the outer tube 24 at the appropriate times to align Z-slot 34 with port 39 and passageway 37 in the transport picker 28 to receive the document from the lifting picker arm. The cam 72 rotates the tube 24 so that the transport picker can deposit the document in the transport section.

Th transport section (FIG. 1) of the business machine includes a pair of feed belts 73 and 74 mounted on pulleys or rolls 75, 76, for transporting the document 12 through the machine. Although belts 73, 74 have been shown as the preferred document feeding means, feed rolls could have been used instead of the belts. The link 20 is eccentrically connected to the roll 76 so as to rock the aligning finger 18 out of the way of a card when the card is ready to be picked from the hopper by the vacuumized lifting picker arm 26.

In order to rotate the inner tube 32 to act as a valve to turn the vacuum on and off, a slot 80 (FIG. 3) is formed in the outer tube 24 through which a stud or the like 82 fixed to the inner tube 34 can extend. A pin 84 is provided on the stud to pivotally support link 86. Link 86 is pivotally connected to bellcrank 88 which is pivoted to the fixed shaft at 90. The other end of bellcrank 88 contains a follower 91 which rides on cam 92. The cam is designed so that the inner tube 34 is moved with respect to the outer tube to align its vacuum slots at predetermined times.

In order to best describe the operation of the picker arms and alignment of the ports during the cycle of feeding a document, reference is made to FIG. 6. The positions of the passageway 36 represent the position of the lifting picker arm 26 at the times noted. The positions of the passageway 37 represents the position of the transport picker arm 28 at the times noted. Also, the positions of the Z-shaped slot 34 represents the position of the inner vacuum tube 32 at the times noted. Since the transport picker arm 28 is fixed to the outer tube 24, the ports 38 in the outer tube 24 will remain in the same relative location with respect to the passageway 37.

The cams 66, 72, 92 and 46 are designed to operate the outer tube 24 and transport picker arm 28, the inner tube 32, the lifting picker arm 26 and the aligner arm 30 to the various positions shown in a standard machine cycle as indicated in FIG. 6. The beginning of a cycle is shown at 0°. At 0° no vacuum is supplied to the passageway 36 or the passageway 37 through the vacuum slots 34 or 38. The cams then begin moving the lifting picker arm 26 and the transport picker arm (outer tube 24) to document picking position over the hopper 14. Also cam 92 begins to rotate the inner tube to gradually begin aligning Z-slot 34, slot 38 and passageway 36.

At 30°, the Z-slot 34, slot 38 and passageway 36 become aligned to fully vacuumize the lifting picker arm. A document is then picked from the hopper 16 by the lifting picking arm 26 through slots 40 by vacuum acting on the surface of the topmost document.

At 36°, cam 72 rotates transport picker arm 28 to bring passageway 27 to document picking position. However, at this position no vacuum has been applied to passageway 37 since inner tube 32 acting as a valve, has not been moved to align Z-slot 34 with slot 39. With passageways 36 and 37 at document picking position, the document is held by the lifting picker arm 26 only. FIG. 7 and FIG. 7*a* show this holding position just prior to alignment at 50° to 60° time.

At 60° to 85° time, the document is aligned to the abutment 58 while the transport picker arm 28 is stationary and the retractable aligning arm 30 is in its downward position as best seen in FIGS. 8 and 8*a*. The cam 66 operates the lifting picker arm 26 to carry the document forward until the leading edge of the document engages the aligning surface 58. At 80° time, the lifting picker arm continues in its forward motion and cam 92 has rotated the inner tube 32 so that the Z-slot 34 begins to align with slot 39 to apply vacuum to passageway 37. During this period, vacuum is applied to both passageways 36 and 37 so that ports 40 and 44 are exposed to the documents to give it greater surface area for straightening out the document.

From 85° to 130° time the air blast finger 22 is operated to separate any additional sheets that may have clung to the picked sheet as a result of static electricity.

Also, at 85° time, cam 92 has begun rotating the inner tube 32 and therefore Z-slot 34 forward to bring slot 39 into better alignment so as to apply a greater vacuum to ports 40 and 44.

From 115° to 131° time the vacuum is transferred from the lifting picker arm 26 to the transporting picker arm 28 as a result of cam 92 rotating inner tube 32 and therefore Z-slot 34 forward while both the lifting picker arm 26 and the transport picker arm 28 were stationary. At 130° time complete transfer has taken place since no portion of Z-slot 34 aligns with slot 38 in the outer tube 24. Therefore, inner tube 32 acting as a valve has cut off vacuum to the lifting picker arm 26.

At 131° time, cam 72 has rotated outer tube 24 and transport picker arm 28 forward. As the transport picker arm 28 moves forward, it carries with it pin 50 to drive aligning arm 30. As this occurs, follower 48 is permitted to ride up on camming surface 46 due to spring 56 which retracts the aligning arm 30. The camming surface 46 is designed so that the aligning abutment 58 is out of the way prior to the document reaching the feed belts 73, 74.

From 131° to 360° time the paper feeding takes place and vacuum is gradually cut off from passageway 37 so that during the time that the feed belt begins to take over, the vacuum does not resist movement of the document in the feed belts. At approximately 160° time cam 92 has rotated inner tube 32 and cam 72 has rotated outer tube 24 so that Z-slot 34 is no longer in alignment with either slots 38 or 39. Therefore, vacuum is cut off from passageways 36 and 37 and the sheet is completely under control of the feed belts. The lifting picker arm 26 and transport picker arm 28 are now ready to begin another cycle.

While the invention has been particularly shown and described with reference to a preferred embodiment thereof, it will be understood by those skilled in the art that various changes in form and details may be made therein without departing from the spirit and scope of the invention.

What is claimed is:

1. In combination with a transport system for a business machine, a document feeding device comprising a hopper containing documents, aligning means in the hopper for aligning the leading edge of the documents to the leading edge of the hopper, a rotatable support tube, a lifting picker arm, transport picker arm and retractable arm supported on the rotatable support tube, vacuum means for applying vacuum to the lifting picker arm to lift documents from the hopper, vacuum means to apply vacuum to the transport picker arm to transport the documents to the transport system of the business machine, abutment means on the retractable aligning arm for aligning the leading edge of the documents picked from the hopper, means for activating the lifting picker arm to transport the document to the transport picker arm and against the retractable abutment means, and means for retracting the abutment means to permit the transfer of the document from the transport picker arm to the transport system.

2. In combination with a transport system for a business machine, a document feeding device comprising a hopper containing documents, preregistration means for registering the documents in the hopper, a support means, a lifting picker arm, a transport picker arm, and a retractable aligning arm supported on the support means, vacuum means for applying vacuum to the lifting picker arm so that the lifting picker arm can lift documents from the hopper, vacuum means for applying vacuum to the transport picker arm to transport cards to the transport section, and camming means for permitting the document to be aligned against the retractable aligning arm and to permit the transport picker arm to transport the document into the transport system.

3. In a document feeding device, the combination of a hopper containing documents, vacuumized lift picker means to singly pick documents from the hopper, vacuumized transport picker means to singly receive the documents from the lift picker means for feeding purposes, abutment means separate from and oscillatable by said transport picker means to align the document, means providing a lost motion connection between said transport picker means and abutment means to permit relative movement therebetween and permit said abutment means to be retracted out of the path of a document prior to the transport picker means delivering the document, and means including cam means and the lost motion means for operating the aligning means, lift picker means, transport picker means and abutment means in sequence.

4. In a document transport system for transporting documents from a hopper, the combination of vacuumized aligning means movable relative to the hopper for prealigning the leading edge of each document successively against the leading wall of the hopper, picking and transporting vacuumized picker means for thereafter picking and transporting documents from the hopper to the transport system, and realigning means for aligning the leading edge of the documents just prior to the documents being transported by the picker means.

5. In combination with a document transport system for a business machine comprising a hopper containing documents: aligning means for aligning the leading edge of the documents to the hopper, at least one lifting vacuumized picker means for lifting the documents from the hopper, at least one oscillating transport picker means for receiving documents from the lifting picker means, at least one realigning means to realign the leading edge of the documents just prior to their entrance into the transport system from said transport picker means, means providing an operative connection between said realigning means and transport picker means whereby said realigning means is actuated by said transport means to perform its realignment operation and is retractably movable relative to said transport means to permit a document to be fed therepast, and cam means to effect such retraction of the realigning means.

References Cited in the file of this patent

UNITED STATES PATENTS

| | | |
|---|---|---|
| 1,300,562 | Blaine | Apr. 15, 1919 |
| 2,233,935 | Backhouse | Mar. 4, 1941 |
| 2,313,100 | Stevens | Mar. 9, 1943 |
| 2,328,943 | Backhouse | Sept. 7, 1943 |